United States Patent
Ananda et al.

(10) Patent No.: US 8,356,335 B2
(45) Date of Patent: Jan. 15, 2013

(54) TECHNIQUES FOR AUTHENTICATION VIA NETWORK CONNECTIONS

(75) Inventors: Gautham Chambrakana Ananda, Karnataka (IN); Girish Ks, Karnataka (IN); Vishnu Govind Attur, Karnataka (IN); Allu Babula, Orissa (IN)

(73) Assignee: Apple Inc., Cupertino, CA (US)

( * ) Notice: Subject to any disclaimer, the term of this patent is extended or adjusted under 35 U.S.C. 154(b) by 1110 days.

(21) Appl. No.: 12/025,945

(22) Filed: Feb. 5, 2008

(65) Prior Publication Data
US 2009/0113528 A1    Apr. 30, 2009

(30) Foreign Application Priority Data
Oct. 30, 2007    (IN) .......................... 2271/DEL/2007

(51) Int. Cl.
*G06F 7/04*    (2006.01)

(52) U.S. Cl. .................................... 726/3; 726/2; 726/11

(58) Field of Classification Search .................. 726/2–3, 726/11–14; 713/168–170, 176
See application file for complete search history.

(56) References Cited

U.S. PATENT DOCUMENTS

| | | | |
|---|---|---|---|
| 5,349,642 A | 9/1994 | Kingdon | |
| RE37,178 E | 5/2001 | Kingdon | |
| 6,615,350 B1 | 9/2003 | Schell et al. | |
| 7,069,438 B2 | 6/2006 | Balabine et al. | |
| 7,257,109 B2 | 8/2007 | Sylvain | |
| 7,631,084 B2 * | 12/2009 | Thomas et al. | 709/227 |
| 2004/0024864 A1 * | 2/2004 | Porras et al. | 709/224 |
| 2004/0203598 A1 * | 10/2004 | Aerrabotu et al. | 455/411 |
| 2005/0076066 A1 * | 4/2005 | Stakutis et al. | 707/200 |
| 2005/0114338 A1 * | 5/2005 | Borthakur et al. | 707/9 |
| 2006/0236093 A1 * | 10/2006 | Brok et al. | 713/151 |
| 2006/0248176 A1 * | 11/2006 | McDowall et al. | 709/223 |
| 2009/0144823 A1 * | 6/2009 | Lamastra et al. | 726/22 |

* cited by examiner

Primary Examiner — Nirav B Patel
(74) Attorney, Agent, or Firm — Blakely, Sokoloff, Taylor & Zafman LLP (57) ABSTRACT

Techniques for authenticating network connections are provided. A client makes a request to connect to a server via a client service. The server delays the request to acquire a signature for the client service from the requesting client's environment. The signature is compared against a known and previously verified signature. When the two signatures match, the server permits the connection between the client and the service via the client service. When the two signatures do not match, the server denies the connection between the client and the server and does not permit the client service to process a request to make that connection.

21 Claims, 4 Drawing Sheets

TECHNIQUES FOR AUTHENTICATION VIA NETWORK CONNECTIONS

RELATED APPLICATIONS

This application claims the benefit of priority to India Patent Application No. 2271/DEL/2007 filed in the India Patent Office on Oct. 30, 2007 and entitled "TECHNIQUES FOR AUTHENTICATION VIA NETWORK CONNECTIONS;" the disclosure of which is incorporated by reference herein.

BACKGROUND

The pervasiveness of the Internet has transformed the way in which enterprises conduct their businesses and the way in which individuals conduct their affairs. Moreover, Internet growth continues to expand in an exponential manner.

However, the security of Internet transactions continues to be a growing concern. Malicious users and automated programs lurk on the Internet for purposes of feigning transactions, acquiring sensitive information, or just wrecking havoc on computing resources for no apparent or even rational reason.

As a result, enterprises invest huge sums of human and capital resources to detect and block security holes in their network connections. Unfortunately it seems just when a fix for one problem is made another security hole is detected or a new and different security hole is detected for a recent fix to an old problem. It often seems that hackers are always a step or two ahead of the security fixes.

One particular area where hackers or their automated programs can be found to be watching is that which is associated with network interfaces. Often an automated program may listen on a local network interface of a particular environment in a manner that is not detected. This is done by the malicious program masquerading as an innocuous or legitimate application on a server or client. The malicious program may intercept a network connection request that occurs between a legitimate client and server. Once intercepted, the malicious program knows how to generate a connection to the server and can propagate bogus connections: to degrade performance of the server, to bring the server down, to launch virus attacks on the server, and/or to perform bogus transactions with the server for purposes of uncovering sensitive information, etc.

Consequently, there is a need for techniques that improve network connection authentication.

SUMMARY

In various embodiments, techniques for authentication of network connections are provided. In an embodiment, a method for authentication of a network connection is provided. More specifically, a network connection request is detected and a network connection accept operation is overridden. The network connection request establishes a connection with a requesting resource when processed. A full network path and a process name for an executable, which are associated with the requesting resource, are acquired, and a signature library is accessed to obtain a first signature for the process name. The obtained first signature is compared to a second signature, which is generated for the executable, and the network connection request is authenticated. The network connection accept operation is processed when the first signature equals the second signature.

DETAILED DESCRIPTION

A "resource" includes a user, content, a processing device, a node, a service, an application, a system, a directory, a data store, a World-Wide Web (WWW) site, an end-user, groups of users, combinations of these things, etc. The terms "service," "module," and "application" may be used interchangeably herein and refer to a type of software resource that includes instructions, which when executed by a machine performs operations that change the state of the machine and that may produce output.

A "client" is an environment having one or more machines (processing devices, such as but not limited to a computer) that is enabled over a network and that includes resources and in some cases processes the resources. A "server" is also an environment having one or more machines that is enabled over a network and that includes resources and in some cases processes the resources. The terms "client" and "server" when used in combination define a client-server architecture, where the client and server are remote from one another over a network connection.

In some cases a client and server may be logically present and defined within different components of a software product or system. This occurs when different components of the product communicate with one another using socket communications. Here, one component acts as a server by listening on a specific communication port on a local loopback interface and another component connects to this server (component), the connecting component being the client. So, in some embodiments the client and server may be logical and present within the same processing environment where one component in a communication transaction acts as a client and another component acts as a server to communicate with one another using Transmission Control Protocol (TCP) socket communications.

The terms "client" and "server" are relative. This means depending upon who is requesting an initial connection a designation of client or server can change. So, a request resource that desires to establish a connection with another resource is designated a client and the resource finalizing and processing the connection is designated as a server. This designation can change when a client is contacted by a resource for a connection request, in which case the client is now designated as a server in this situation.

Various embodiments of this invention can be implemented in existing network architectures, network devices, network interfaces, security systems, data centers, and/or communication devices. For example, in some embodiments, the techniques presented herein are implemented in whole or in part in products distributed by Novell®, Inc., of Provo, Utah.

Of course, the embodiments of the invention can be implemented in a variety of architectural platforms, network resources, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-4.

Figure 1:
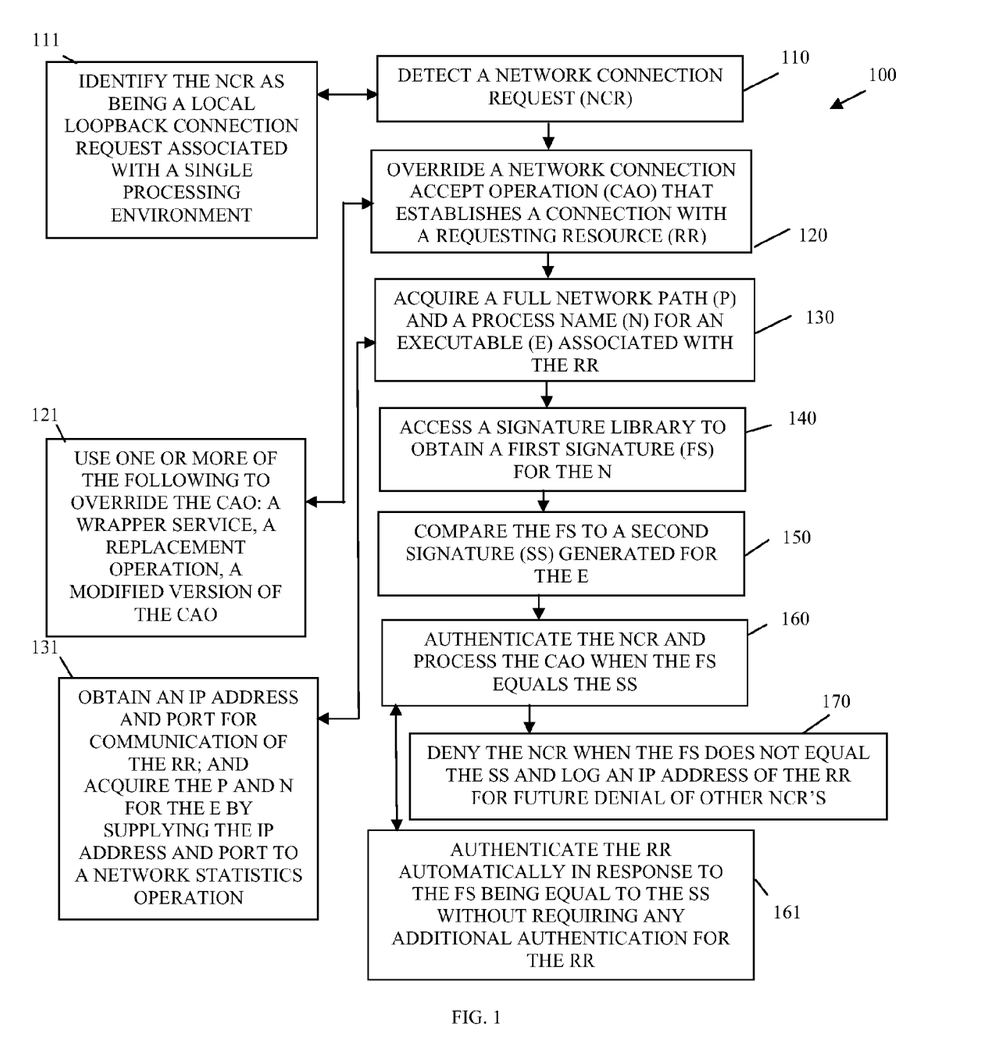
FIG. 1 is a diagram of a method for authentication of a network connection, according to an example embodiment.

FIG. 1 is a diagram of a method 100 for authentication of a network connection, according to an example embodiment. The method 100 (hereinafter "connection authentication service") is implemented as instructions in a machine-accessible and computer-readable medium. The instructions when executed by a machine (computer or processing device) perform the processing depicted in FIG. 1. The connection authentication service is also operational over and processes within a network. The network may be wired, wireless, or a combination of wired and wireless.

The connection authentication service processes on a server in a client-server architecture and receives network connection requests from a requesting resource of a client. As will be described in greater detail herein and below the connection authentication service delays the connection requests until a signature associated with an executable that the requesting resource uses to make the requests has its signature verified. This permits authentication of the requesting resource without any additional authentication information being required by the requesting resource and ensures a valid connection to the server.

At 110, the connection authentication service detects a network connection request from a requesting resource over a network. In an embodiment, the detection may be made on a network interface associated with the server. This can occur by listening for or detecting when a network accept operation or call is made by the requesting resource.

According to an embodiment, at 111, the connection authentication service identifies the network connection request as being a local loopback connection request associated with a single processing environment. In other words, the request may be processed on the server when it is received from a local client (requesting resource) associated with the server and occurs on the server. The processing uses the network system calls to process the local server request as if it were an external network request occurring over a WAN and from an entirely different processing environment.

At 120, the connection authentication service overrides a network connection accept operation that establishes a connection with the requesting resource. In other words, the requesting resource is not permitted to fully process a desired network connection accept operation. The overriding can occur in a variety of ways.

For example, at 121, at least three mechanisms are discussed for the connection authentication service to override a network accept operation or call. The connection authentication service can use a wrapper that is called whenever a reference is made within the server to the network accept operation, the wrapper alerts the connection authentication service to the attempt being made to process the network accept operation or call. The actual network accept operation can be processed and the techniques of the connection authentication service executed, and if authentication is not successful, the connection can be aborted and return an error before the requesting resource is permitted to use any connection to the server.

In another case, also detailed at 121, the connection authentication service can be implemented as an actual replacement for the existing network accept operation or system call, such that it is always called when a requesting resource tries to establish a network connection to the server.

In still another situation, still detailed at 121, the network accept operation or call is accepted and permitted to proceed to get details associated with the network accept operation, such as the IP address of the requesting resource and port being used by the requesting resource to make the network connection request. Once this information is known the processing can delay permitting the requesting resource to do anything with the connection until the processing of the connection authentication service completes and authentication is achieved and if authentication is not achieved the connection is terminated.

At 130, the connection authentication service acquires a full network path and a process name for an executable associated with the requesting resource. This information permits the connection authentication service to obtain the executable for a service associated with the requesting resource that is being used to make the network connection request. The executable can then be evaluated, as described below, to authentication the network connection request.

According to an embodiment, at 131, the connection authentication service obtains an Internet Protocol (IP) address and a port for the communication of the requesting resource. Once this is obtained the full path and the process name can be acquired by supplying the IP address and the port to a network statistics operation or system call (netstats, etc.). The network statistics operation returns the full path of the executable and the process name or identifier being used by the requesting resource to make the network connection request.

At 140, the connection authentication service accesses a signature library to obtain a first signature for the process name of the executable. This was previously recorded and noted in the signature library when the requesting resource made a first request to connect to the server where additional authentication may have been required at that time to satisfy the server that the requesting resource and its executable were in fact legitimate. Once this initial authentication is achieved, the first signature is obtained and recorded in the signature library and can be used on a regular bases each time the requesting resource attempts to reconnect to the server. Should the executable be upgraded or enhanced in some manner, then the additional authentication of the requesting resource may have to occur again to establish a modified first signature that is recorded or updated to the signature library. In other cases, the first signature can be acquired by a third-party service that is trusted and in a secure communication relationship with the connection authentication service. In still more cases, the first signature can be acquired or identified by an administrator and noted in the signature library for use.

At 150, the connection authentication service compares the first signature of the executable to a second signature that is generated for the executable. The second signature can be generated by traversing the full path and using the process name to acquire the executable and then processing a signature generating algorithm against the data of the executable to generate the second signature.

At 160, the connection authentication service authenticates the original network connection request and permits the network connection operation to fully complete processing and remain unabated when the first signature is equal to the second signature.

In an embodiment, at 161, the connection authentication service automatically authenticates the requesting resource when the first signature is equal to the second signature without requiring any additional authentication or any additional authentication information from the requesting resource.

Thus, validation and authentication can be achieved by inspecting incoming connection and finding the executable (via the process name and full path), which is associated with the making the connection, and then checking the executable's signature against a previously retained signature for that executable.

According to an embodiment, at 170, the connection authentication service denies the network connection request when the first signature does not equal the second signature. This can also result in logging the IP address of the requesting resource that attempted to make the connection. This IP address may, via policy, be used to reject or deny future attempts by a resource at that IP address to make another and different network connection request. So, a listing of invalid IP addresses can be noted and used to quickly deny certain IP addresses access to the server.

Existing technologies authenticate incoming socket connections by using certificate verification, handshake techniques, encryption techniques, etc., which is time consuming and actually done after a connection is accepted on a server. With the processing of the connection authentication service, incoming connections are authenticated during an initial accept stage of a network connection attempt or request; so, only authorized connections are ever accepted. This reduces the risk of Denial of Service (DoS) and replay attacks.

The connection authentication service can be used with TCP originating from local loopback connections. Moreover, the connection authentication service can also be used to validate incoming User Datagram Protocol (UDP) incoming messages.

Furthermore, the risk of bringing down a server is diminished with the techniques presented herein. Conventionally, if some server is listening on a local loopback or local interface there is a chance of bringing down the server using some malware (malicious software or process), which can make a lot of bogus connections to the server. So may connections can be generated that the server degrades or comes down completely. This problem is solved here because a valid connection to the server is identified on the bases of a signature associated with the executable that is attempting to connect to the server. This is done by intercepting an accept socket call to acquire the requesting resource's (client's) IP address and port. Once the IP address and port is available, the process name and the full executable path of the connecting client binary can be found. Once the binary information is found, then the server can check for a valid signature in the client library. Thus, the connection authentication service can easily authenticate incoming client connections without using any additional authentication methods, handshakes, etc.

Again, the connection authentication service provides a mechanism that uses information associated with incoming connections to validate those incoming connections. Malicious attempts are detected via their own supplied information. The connection authentication service intercepts and overrides an accept socket call so that whenever any new connections comes into the server, the intercept accept socket call provides the incoming connection's IP address and port. This information is used to obtain the process identifier and path of the executable being used to make the connection request. For example a netstat command can be used to provide the process identifier and the path once the IP address and port are known. If the incoming connection is initiated from a valid executable, then the overridden accept socket call can be used to actually call the system accept connection call or operation; otherwise the incoming connection is rejected and the connection denied.

Figure 2:
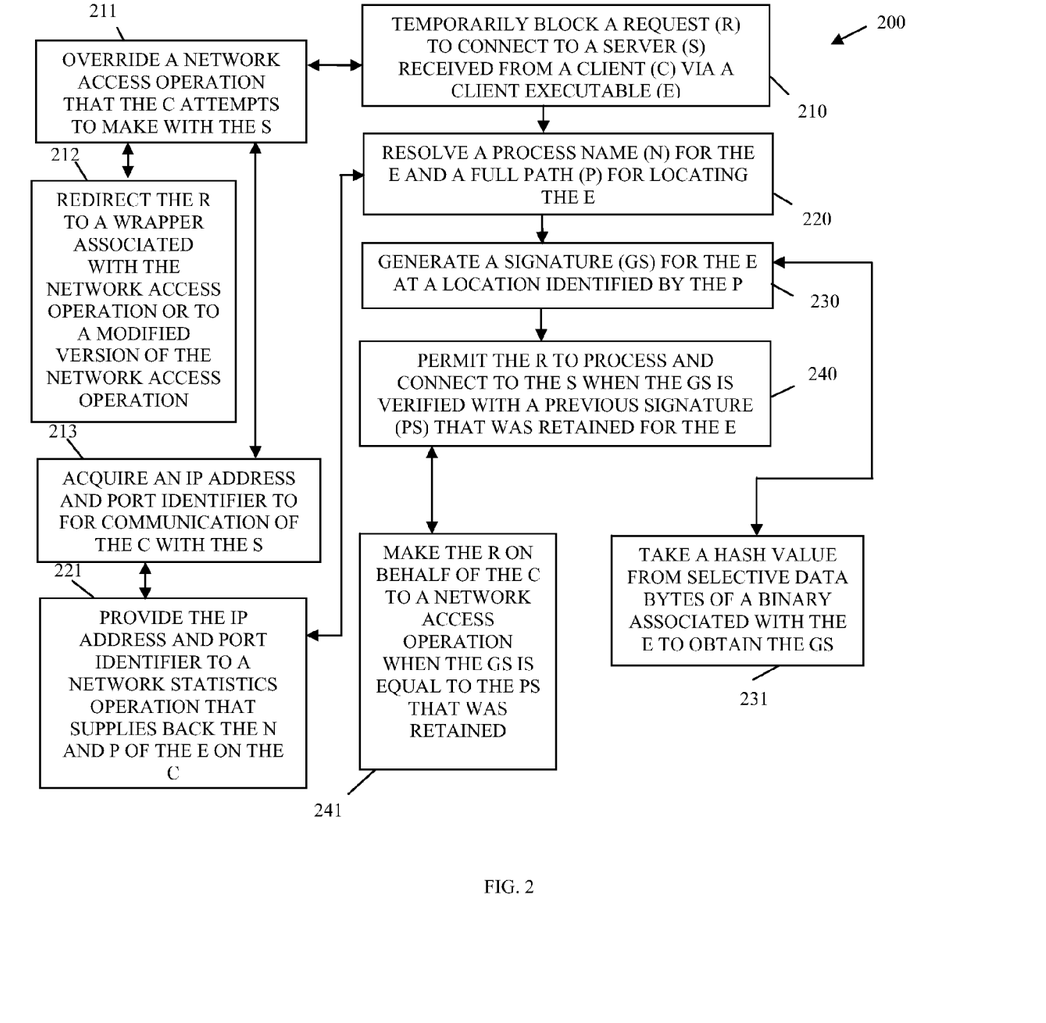
FIG. 2 is a diagram of another method for authentication of a network connection, according to an example embodiment.

FIG. 2 is a diagram of another method for authentication of a network connection, according to an example embodiment. The method 200 (hereinafter "server service") is implemented in a machine-accessible and readable medium as instructions. The instructions when executed by a machine perform the processing depicted in the FIG. 2. Moreover, the server service is operational over a network, and the network may be wired, wireless, or a combination of wired and wireless.

In an embodiment, the server service is another version of and an alternative perspective to the connection authentication service that was in detail above with reference to the method 100 of the FIG. 1.

Again, the server service is operational within a server environment over a network.

At 210, the server service temporarily blocks a request to connect to a server. The request is received from a requesting client via a client executable.

In an embodiment, at 211, the server service overrides a network access or accept operation that the client attempts to make with the server. In other words a network accept connection, is monitored and is selectively permitted to complete if authentication is successfully achieved otherwise the network accept operation is denied. This overriding can be achieved in a variety of manners.

For example, at 212, the server service can redirect the request to a wrapper associated with the network access or accept operation or redirect the request to a modified version of the access or accept operation.

In still another situation, at 213, the server service acquires an IP address for the client and a port identifier that the client uses to communicate with the server.

At 220, the server service resolves a process name for the client executable and a full executable path for locating that executable on the network.

According to an embodiment, at 221, the server service provides the IP address and the port identifier acquired at 213 to a network statistics operation, such as the netstat operation. The network statistics operation supplies back the process name and the port identifier of the client executable on the client.

At 230, the server service generates a signature for the client executable at a location identified by the full executable path. This can be achieved in a variety of manners.

For example, at 231, the server service takes a hash value from selective data bytes of a binary associated with the client executable to obtain the generated signature. Of course other techniques may be used as well to generate the second signature associated with the client executable.

At 240, the server service permits the request to process and to connect to the server when the generated signature is verified with a previous signature that was retained for a previously verified and authenticated version of the client executable.

In an embodiment, at 241, the server service makes the request on behalf of the client to a network access or accept operation when the generated signature is equal to the previous signature that was previously retained.

Figure 3:
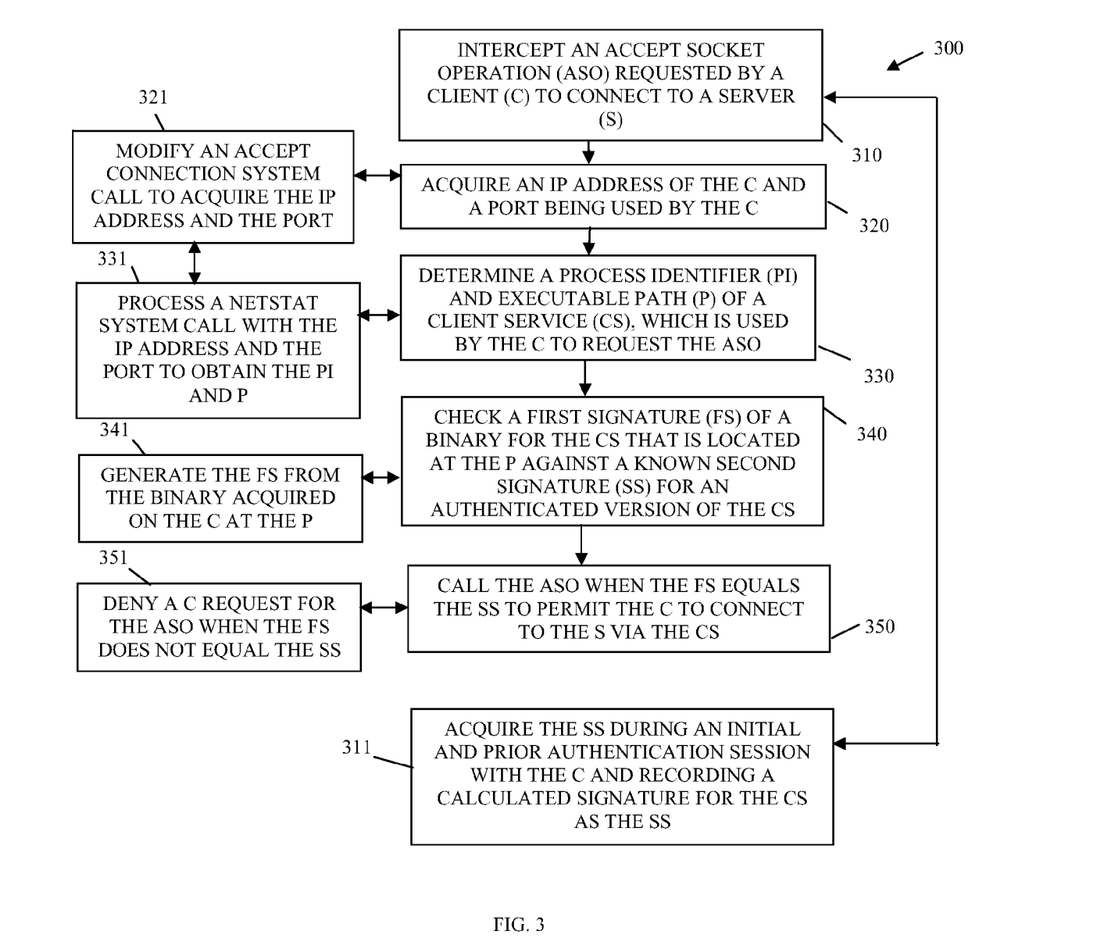
FIG. 3 is a diagram of yet another method for authentication of a network connection, according to an example embodiment.

FIG. 3 is a diagram of yet another method 300 for authentication of a network connection, according to an example embodiment. The method 300 (hereinafter "authentication service") is implemented in a machine-accessible and readable medium as instructions. The instructions when executed by a machine perform the processing depicted in the FIG. 3. Moreover, the authentication service is operational over a network, and the network may be wired, wireless, or a combination of wired and wireless.

The authentication service represents alternative and in some instances enhanced processing associated with the methods 100 and 200 of the FIGS. 2 and 3, respectively (discussed in detail above). The authentication service operates within the context of a network interface of a server.

At 310, the authentication service intercepts an accept socket call operation requested by a client to connect to a server. In an embodiment, the client and server are logically associated with the same environment and are a situation where a software system includes a variety of components that connect and communicate with one another via TCP socket communications using a local loopback connection technique.

According to an embodiment, at 311, and actually before the processing depicted at 311 (it is noted that in some instances the processing of FIG. 3 is not to be limited to any particular processing order). At 311, the authentication service acquires a second digitally generated signature (discussed more completely below) for a client service that the client uses to attempt to connect to the server. This may have been acquired via a prior authentication session that the server had with the client in which additional authentication credentials are obtained according to policy defined constraints on access to the server. That second signature is recorded as a calculated signature for the executable (binary) of the client service and retained for future use (discussed more completely below) as the known second signature.

At 320, the authentication service acquires an IP address of the client and a port being used for communication between the client and the server.

In an embodiment, at 321, the authentication service acquires the IP address and port of the client by modifying an accept connection system call, which when processed returns the client IP address and port being used for communication by the client with the server.

At 330, the authentication service determines a process identifier and executable path of a client service. The client uses a client service executable program to communicate over the port with the server to attempt to make the accept socket operation with the server.

According to an embodiment, at 331, the authentication service processes a netstats system call with the previously obtained IP address and port of the client. In response to this information, the netstats system call returns back to the authentication service the executable path of the client service and the process identifier for the client service.

Armed with the executable path and the process identifier for the client service, the authentication service can now acquire a binary version of the client service for purposes of generating a signature for the binary.

Accordingly, at 340, the authentication service generates a first signature of the binary for the client service. The binary is located at the executable path location and identified via the process identifier. Next, the authentication service checks the first signature of the binary against a known second signature for the client service. This known second signature was previously obtained during an initial authentication of the client with the server (discussed above with reference to the processing at 311).

In an embodiment, at 341, the authentication service generates the first signature dynamically and in real time from the binary acquired from the client. That is, the executable path leads to a location on the client or within an environment of the client and the process identifier can be used to then properly locate the binary of the client service. Any signature generating or hash value producing algorithm can be used to generate and produce the first signature. The same algorithm was also used to previously produce the known second signature.

At 350, the authentication service calls the accept socket operation when the first signature is equal to the known second signature. This permits the client to connect to the server via the client service being used by the client. Notice that authentication for this particular connection request did not require the client to provide any specific authentication information or to perform any specific authentication procedure. So, once the known second signature is acquired each and every subsequent connection attempt made by the client requires no authentication and requires no authentication information of the client. Thus, the authentication of each additional connection request is automated, secure, transparent, and seamlessly achieved via signature processing as detailed above.

At 351 and when the first signature does not equal the known second signature, the authentication service denies the client's request for processing the accept socket operation. In such a case, and according to other policy constraints, the authentication service can log the client's IP address and automatically deny any additional connection requests that emanate from this particular client. Reports and audit trails may also be produced to show where bogus connection requests are coming from, how frequently they are coming, and devices from which they are coming.

In some cases, when the client is logical and may already reside on the server as a component of a software system that uses socket communications, the authentication service may alert an administrator that potential malware is present on the server or that a particular client on the server has been compromised or corrupted (intentionally or unintentionally via software error) in some manner. Still other policy constraints may instruct the authentication service to automatically disable the logical client when this particular situation is encountered.

Figure 4:
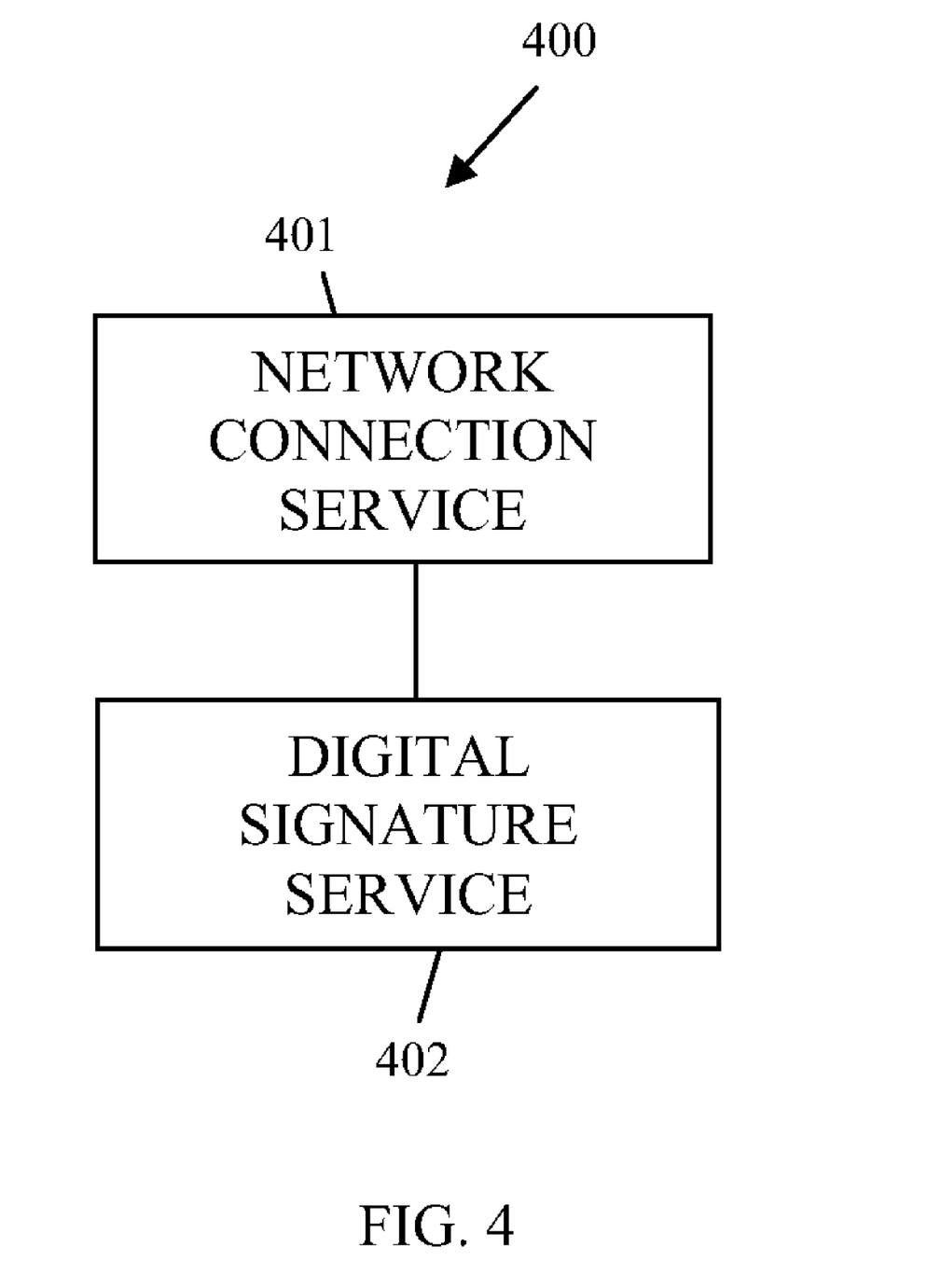
FIG. 4 is a diagram of a network connection authentication system, according to an example embodiment.

FIG. 4 is a diagram of a network connection authentication system 400, according to an example embodiment. The network connection authentication system 400 is implemented as instructions on or within a machine-accessible and computer-readable medium. The instructions when executed by one or more machines perform, among other things, processing depicted with respect to the methods 100, 200, and 300 of the FIGS. 1-3, respectively. The network connection authentication system 400 is also operational over a network, and the network may be wired, wireless, or a combination of wired and wireless.

The network connection authentication system 400 includes a network connection service 401 and a digital signature service 402. Each of these and their interactions with one another will now be discussed in turn.

The network connection service 401 is implemented in a machine-accessible and computer-readable medium and is to process on a server machine. Some example processing associated with the network connection service 401 is presented above with reference to the methods 100, 200, and 300 of the FIGS. 1-3, respectively.

The network connection service 401 executes and processes as instructions on the server machine and inspects an accept network connection call that is requested by a client. The accept network connection call request is inspected by the network connection service 401 before it is permitted to completely process on the server and before the client is permitted to establish a successful connection with the server.

The digital signature service 402 is implemented in a machine-accessible and computer-readable medium and is to process on the server machine. Different aspects of the digital signature service 402 was presented in detail above with reference to the methods 100, 200, and 300 of the FIGS. 1-3, respectively.

The digital signature service 402 also processes as executable instructions on the server. The digital signature service 402 dynamically and in real time generates a first digital signature for an executable that the client uses to request the accept network call. Moreover, the digital signature service 402 compares the first signature to a second signature known for that executable. The second signature is associated with a previously verified version of the executable. Techniques for establishing or acquiring the second signature for the executable were described in detail herein and above.

The digital signature service 402 then compares the first signature against the second signature and when they are the same, the network connection service 401 is alerted and the network connection service 401 permits the accept network connection call to complete processing and establish the connection being requested between the client and the server. This is achieved without any additional authentication being required of the client.

In other words, the client is unaware of any authentication occurring at all and does not supply any cookie or any other information, the system 400 authenticates the connection request using the data of the binary for the client that is attempting to make the accept network connection call on the server. This cannot be feigned because the application trying to make the connection is inspected and a first signature acquired, this is then compared to a second known and valid signature, and if any tampering occurred the connection is denied. So, this process is seamless and secure and is done in a manner that the client is totally unaware of.

In an embodiment, the network connection service 401 is implemented as a wrapper to the accept network connection call. In another case, the network connection service 401 is implemented as a modified and enhanced version of the accept network connection call.

In a particular case, the network connection service 401 makes a netstats system call to acquire a full path and process identifier for the executable of the client; again, the executable is the application that the client is using to attempt to make the accept network connection call on the server. The digital signature service 402 traverses the full path to a particular client location or client binary library and uses the process identifier to locate the executable in binary form for purposes of generating the first signature. The modified accept network connection call returns the IP address of the client and the port being used by the executable to communicate with the server. The IP address and the port when passed to the netstats system call results in the full path for the executable and the processing identifier being returned. This permits data for the executable application to be obtained in a dynamic and real-time fashion and then selective data bytes of the executable can be used with a signature generating algorithm to produce the first signature, which is then compared against the second and previously verified second signature.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
   detecting a network connection request made by a requesting resource;
   overriding a network connection accept operation that attempts to establish a connection with the requesting resource, the requesting resource is not permitted to fully process the network connection accept operation by the overriding the network connection accept operation;
   acquiring a full network path and a process name for an executable of the requesting resource;
   accessing a signature library to obtain a first signature for the process name, the first signature is generated during a first connection request made by the requesting resource and acquired from a digital signature service;
   comparing the obtained first signature to a second signature that is generated for the executable, and the second signature generated from a binary of executable for the requesting resource;
   authenticating the network connection request and processing the network connection accept operation to make the connection when the first signature equals the second signature, the requesting resource is unaware of any authentication occurring at all the authentication occurs without the requesting resource supplying any information;
   denying the network connection request when the first signature does not equal the second signature; and
   logging an Internet Protocol (IP) address associated with the requesting resource for subsequent reporting and denial of future connection requests attempted by the requesting resource.

2. The method of claim 1, wherein detecting further includes identifying the network connection request as being a local loopback connection request associated with a single processing environment.

3. The method of claim 1, wherein overriding further includes one or more of the following:
   using a wrapper service that processes when an attempt is made to process the network connection accept operation;
   using a replacement operation that processes when an attempt is made to process the network connection accept operation; and
   using a modified version of the network accept operation that processes when an attempt is made to process the network accept operation.

4. The method of claim 1, wherein acquiring further includes:
   obtaining an Internet Protocol (IP) address for the requesting resource and a port over which communication is occurring for the requesting resource from the overridden network connection accept operation; and acquiring the full path name and the process name for the executable by supplying the IP address and the port to a network statistics operation.

5. A machine-implemented method, comprising:

temporarily blocking a request to connect to a server and not permitting a connection to the server, the request received from a client executable of a client, the client not permitted to make the connection by blocking the request;

resolving a process name for the client executable and a full path for locating the executable;

generating a signature for a binary of the client executable located at a location identified by the full path;

permitting the request to process and connect to the server when the generated signature is verified with a previous signature that was retained for the client executable, the client unaware of any verification, and without the client supplying any information for performing the verification, the previous signature is generated during a first connection request made by the client and acquired from a digital signature service third party;

denying the network connection request when the generated signature does not equal the previous signature; and logging an Internet Protocol (IP) address associated with the client for subsequent reporting and denial of future connection requests attempted by the client.

6. The method of claim 5, wherein temporarily blocking further includes overriding a network access operation that the client attempts to make with the server.

7. The method of claim 6, wherein overriding further includes redirecting the request to a wrapper that is associated with the network access operation or to a modified version of the network access operation.

8. The method of claim 6, wherein overriding further includes acquiring an Internet Protocol (IP) address for the client and a port identifier being used for communication with the server.

9. The method of claim 8, wherein resolving further includes providing the IP address and the port identifier to a network statistics operation that supplies back the process name of the client executable that the client is using and supplies back the full path.

10. The method of claim 5, wherein generating further includes taking a hash value from selective data bytes of a binary associated with the client executable.

11. The method of claim 5, wherein permitting further includes making the request on behalf of the client to a network access operation when the generated signature is equal to the previous signature that was retained.

12. A machine-implemented method, comprising:

intercepting an accept socket operation requested by a binary of an executable for a client to connect to a server and not permitting the client to connect to the server by intercepting the accept socket operation;

acquiring an Internet Protocol (IP) address of the client and port being used by the client;

determining a process identifier and an executable path of a client service represented by the binary and which is being used by the client to request the accept socket operation;

checking a first signature of the binary for the executable of the client service that is located at the full path on the client against a known second signature for an authenticated version of the client service, the known second signature acquired from a digital signature service and the second signature acquired via an initial authentication session with the client service where during that initial authentication session the client service supplied additional authentication information for the client service and the binary;

calling the accept socket operation when the first signature equals the known second signature to permit the client to connect to the server via the client service, the client is unaware of any authentication, and without the client service supply any information to perform the checking;

denying the network connection request when the first signature does not equal the known second signature; and logging an Internet Protocol (IP) address associated with the client for subsequent reporting and denial of future connection requests attempted by the client.

13. The method of claim 12, wherein acquiring further includes modifying an accept connection system call to acquire the IP address and the port.

14. The method of claim 13, wherein determining further includes processing a netstat system call with the acquired IP address and the acquired port to obtain the process identifier and the full path.

15. The method of claim 14 wherein checking further includes generating the first signature from the binary acquired on the client at the full path.

16. The method of claim 14, wherein calling further includes denying the client's request for the accept socket operation when the first signature does not equal the known second signature.

17. The method of claim 12 further comprising, acquiring the known second signature during an initial and prior authentication session with the client and recording a calculated signature on the client service as the known second signature.

18. A machine-implemented system, comprising:

a server machine having,
  a processor and a memory;
a network connection service process on the server machine;
a digital signature service;
wherein the network connection service is to inspect an accept network connection call requested by a binary for an executable of a client and made to the server before the accept network connection call is permitted to completely process and establish a connection between the client and the server, the client is not permitted to make the connection based on inspection of the accept network connection call, and wherein the digital signature service generates a first signature for the executable that the client uses to request the accept network call and compares it to a second signature for a previously verified version of the binary for the executable, the second signature is generated during a first connection request made by the client and acquired from the digital signature service, and when the first and second signature are the same, the network connection service permits the accept network connection call to complete processing and establish the connection between the client and the service, the client is unaware of any authentication occurring, and without the client supplying any information for the connection, and wherein the connection is denied when the first signature does not equal the second signature and an Internet Protocol (IP) address associated with the client for subsequent reporting and denial of future connection requests attempted by the client.

19. The system of claim 18, wherein the network connection service is implemented as a wrapper to the accept network connection call.

20. The system of claim 18, wherein the network connection service is a modified version of the accept network connection call.

21. The system of claim 18, wherein the network connection service makes a netstat system call to acquire a full path and process identifier of the executable that client uses to make the accept network connection call and the digital signature service traverses the full path to the client and uses the process identifier to locate the executable for purposes of generating the first signature.

* * * * *